United States Patent
Salvisberg

(10) Patent No.: US 6,637,787 B1
(45) Date of Patent: Oct. 28, 2003

(54) MOTORCYCLE ENGINE COVER BUMPER DEVICE

(76) Inventor: Marc Salvisberg, 855 San Anselmo Ave., San Anselmo, CA (US) 94901

( * ) Notice: Subject to any disclaimer, the term of this patent is extended or adjusted under 35 U.S.C. 154(b) by 0 days.

(21) Appl. No.: 10/241,724

(22) Filed: Sep. 11, 2002

(51) Int. Cl.[7] .............................................. B60R 19/56
(52) U.S. Cl. ........................ 293/105; 280/291; 180/219
(58) Field of Search ......................... 293/105; 180/219, 180/227, 229, 311, 68.1; 73/117; 280/284, 276, 755, 152.1, 279; 276/28.1

(56) References Cited

U.S. PATENT DOCUMENTS

| | | | | |
|---|---|---|---|---|
| 1,941,801 A | * | 1/1934 | Harley | 293/105 |
| 2,589,644 A | * | 3/1952 | Thostenson | 293/105 |
| 3,964,564 A | * | 6/1976 | Pittarelli | 180/219 |
| 4,311,335 A | * | 1/1982 | Winiecki | 293/105 |
| 4,416,465 A | * | 11/1983 | Winiecki | 280/290 |
| 4,546,993 A | * | 10/1985 | Walker | 280/291 |
| 4,591,179 A | * | 5/1986 | Nakamura | 280/291 |
| 4,618,019 A | * | 10/1986 | Ando et al. | 180/219 |
| 4,797,791 A | * | 1/1989 | Burchick | 280/291 |
| 5,106,136 A | * | 4/1992 | Crain | 293/105 |
| 5,454,580 A | * | 10/1995 | Lin | 280/291 |
| 5,482,307 A | * | 1/1996 | Lin | 280/291 |
| 5,638,723 A | * | 6/1997 | Lin | 280/291 |

FOREIGN PATENT DOCUMENTS

JP          5 2213262     *  8/1993

* cited by examiner

*Primary Examiner*—Kiran Patel
(74) *Attorney, Agent, or Firm*—Cherskov & Flaynik

(57) ABSTRACT

A motorcycle engine cover bumper device (10) includes a road engagement memberr (12) joined to an outer wall (16) of a motorcycle engine cover (18) such that the road engagement member (12) engages a road surface before the motorcycle engine cover (18) thereby preventing damage to the cover when a motorcycle (47) travels around a road bend or during a "controlled crash" when a side portion of the motorcycle slides upon the road surface.

39 Claims, 8 Drawing Sheets

MOTORCYCLE ENGINE COVER BUMPER DEVICE

BACKGROUND OF THE INVENTION

1. Field of the Invention

The present invention relates to the field of motorcycle engines and more particularly, to a motorcycle engine cover bumper device that prevents engagement between a motorcycle engine cover and a road surface when the motorcycle driver "leans" or shifts his weight upon the motorcycle while traveling around a road bend, or during a "controlled crash" when the driver loses control causing a side portion of the motorcycle to slide upon the road surface.

2. Background of the Prior Art

Individuals ride motorcycles for basic transportation, recreation and competition. When riding around sharp road bends or under racing conditions on a track, motorcycle driver must constantly shift their weight and/or lean the motorcycle such that a lower portion of a motorcycle engine cover is disposed relatively close to the road surface. Referring to FIG. 1, a perspective view of a typical prior art motorcycle engine cover is illustrated. A problem arises when the motorcycle driver encounters a severe road bend and leans the motorcycle (driver is in control) to such an extreme position that the lower portion of the motorcycle engine cover to engages the road surface. This problem not only damages the motorcycle engine cover, but also creates an unacceptable safety hazard for the motorcycle driver. Another problem arises when a motorcycle driver loses control of the motorcycle resulting in the motorcycle falling over or "laying down" and sliding upon the road surface such that the motorcycle engine cover engages the road surface causing a "shower" of sparks to spray upon the driver. A need exists for a device that prevents the motorcycle engine cover from engaging a road surface irrespective of the degree of control the driver has upon the motorcycle. The device must be capable of being installed relatively easily on both new and used motorcycles, relatively inexpensive, capable of wear without generating sparks, durable, stable and easily replaced.

SUMMARY OF THE INVENTION

It is an object of the present invention to overcome many of the disadvantages associated with unprotected motorcycle engine covers.

A principle object of the present invention is to provide a device that protects a motorcycle engine cover when a driver leans the motorcycle while traveling through a road bend or after a fall when the motorcycle slides upon a road surface. A feature of the device is a road engagement member. An advantage of the device is that the road engagement member will engage a road surface should the motorcycle be leaned excessively or slide upon a road surface. Another advantage is that the motorcycle engine cover will not engage the road surface while the motorcycle leans excessively or slides upon a road surface.

Another object of the present invention is to provide a device that is unobtrusively secured to a motorcycle engine cover. A feature of the device is a pair of opposing, countersunk, horizontally aligned fasteners. An advantage of the device is that only the road engagement member engages a road surface.

Still another object of the present invention is to provide a device that provides an optimum surface area of engagement. A feature of the device is an outer wall with a beveled periphery. Another feature of the device is an elliptically configured road engagement member. An advantage of the device is that the road engagement member has a larger surface area of engagement that increases the longevity of the member.

Yet another object of the present invention is to provide a device that promotes stability between the road engagement member and motorcycle engine cover. A feature of the device is a road engagement member receiving recess in the motorcycle engine cover. An advantage of the device is that the road engagement member will not separate from the motorcycle engine cover should the engagement member contact the road surface.

Another object of the present invention is to provide a device that may be utilized with a myriad of different motorcycles. A feature of the device is an indentation in a lower portion of a motorcycle engine cover. An advantage of the device is that the longitudinal dimension of road engagement member is minimized to obtain a required lean capability for the respective motorcycle, and to promote minimal interference with the legs and/or feet of the motorcycle driver.

Briefly, the invention provides a motorcycle engine cover bumper device comprising a road engagement member; means for attaching said member to the motorcycle engine cover; and means for positioning said road engagement member upon the motorcycle engine cover such that the road engagement member will engage a road surface before the motorcycle engine cover engages the road surface.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
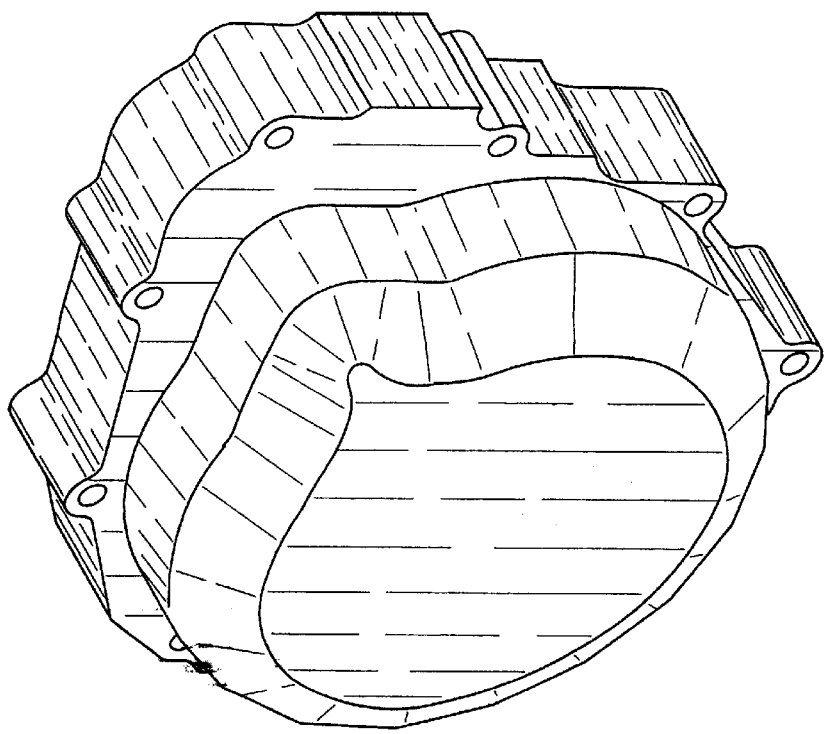
FIG. 1 is a perspective view of a typical motorcycle engine cover.
Figure 2:
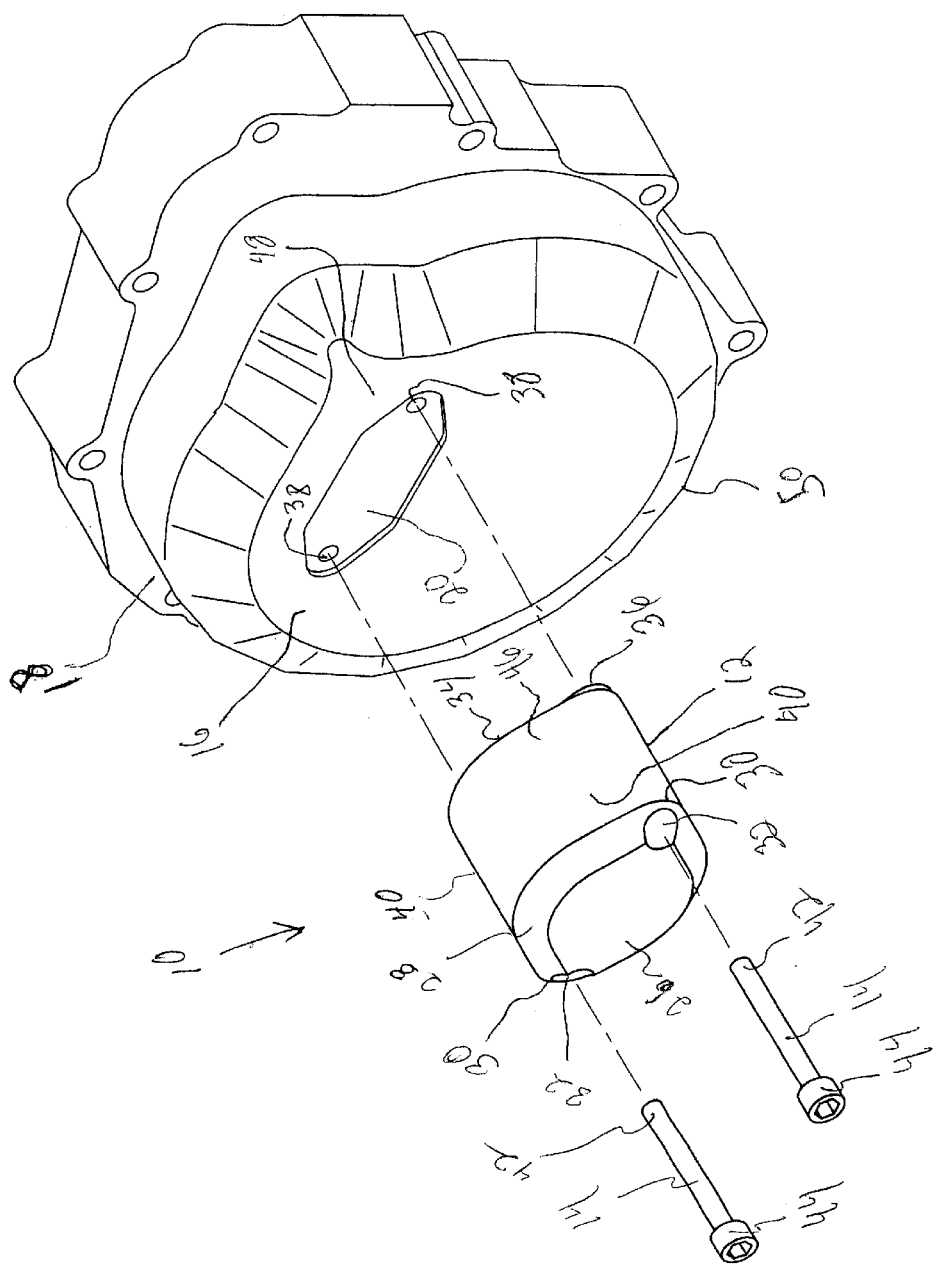
FIG. 2 is an exploded perspective view of a motorcycle engine cover and a detached engine cover bumper device.
Figure 3:
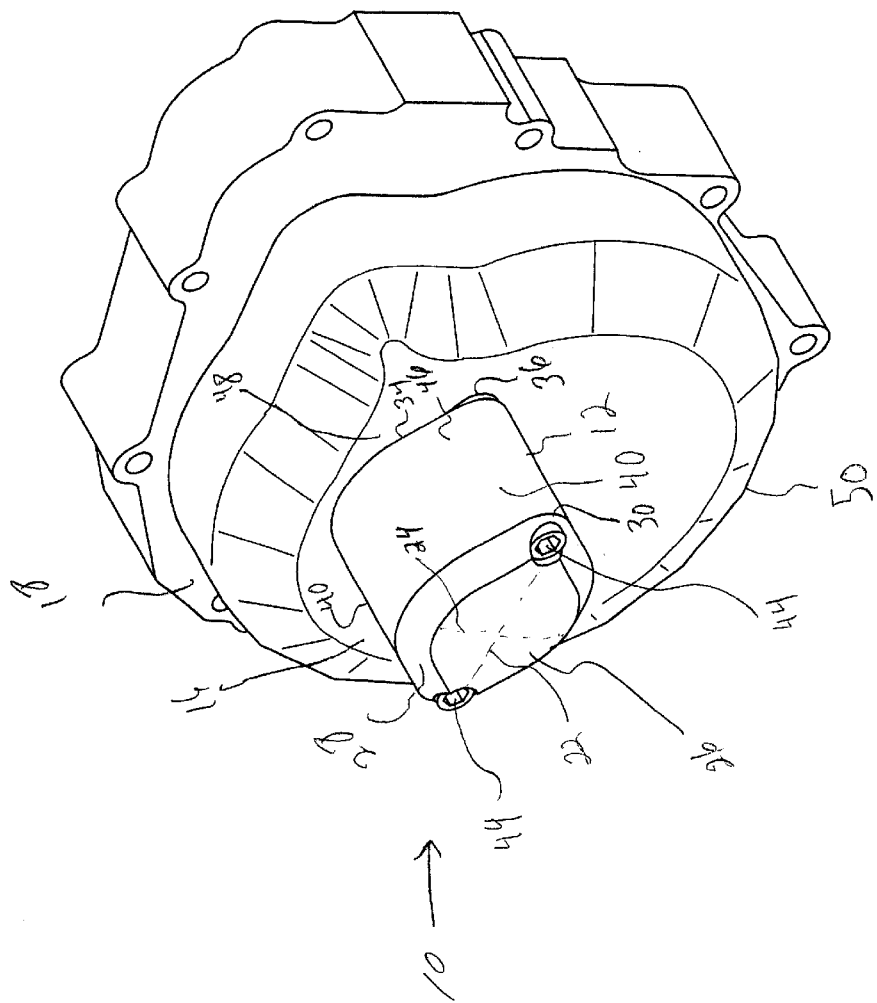
FIG. 3 is perspective view of a motorcycle engine cover and an engine cover bumper device attached thereto.
Figure 4:
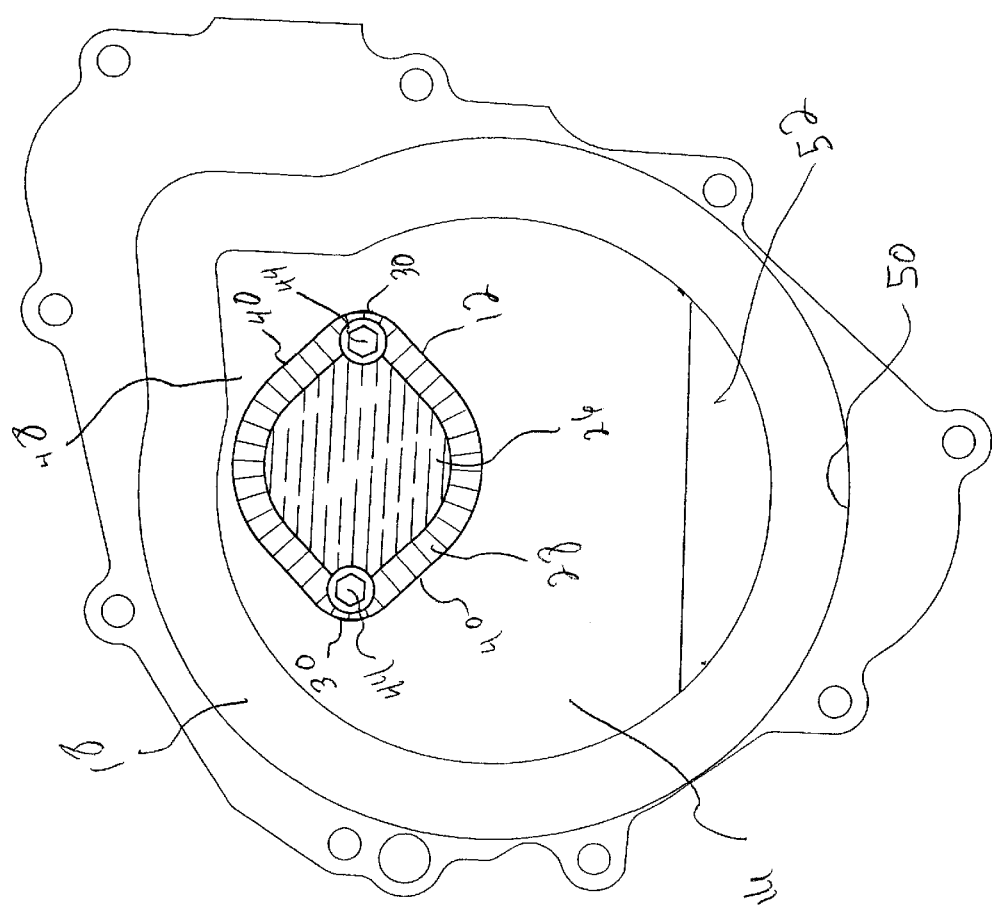
FIG. 4 is a front elevation view of the engine cover and bumper device of FIG. 3.
Figure 5:
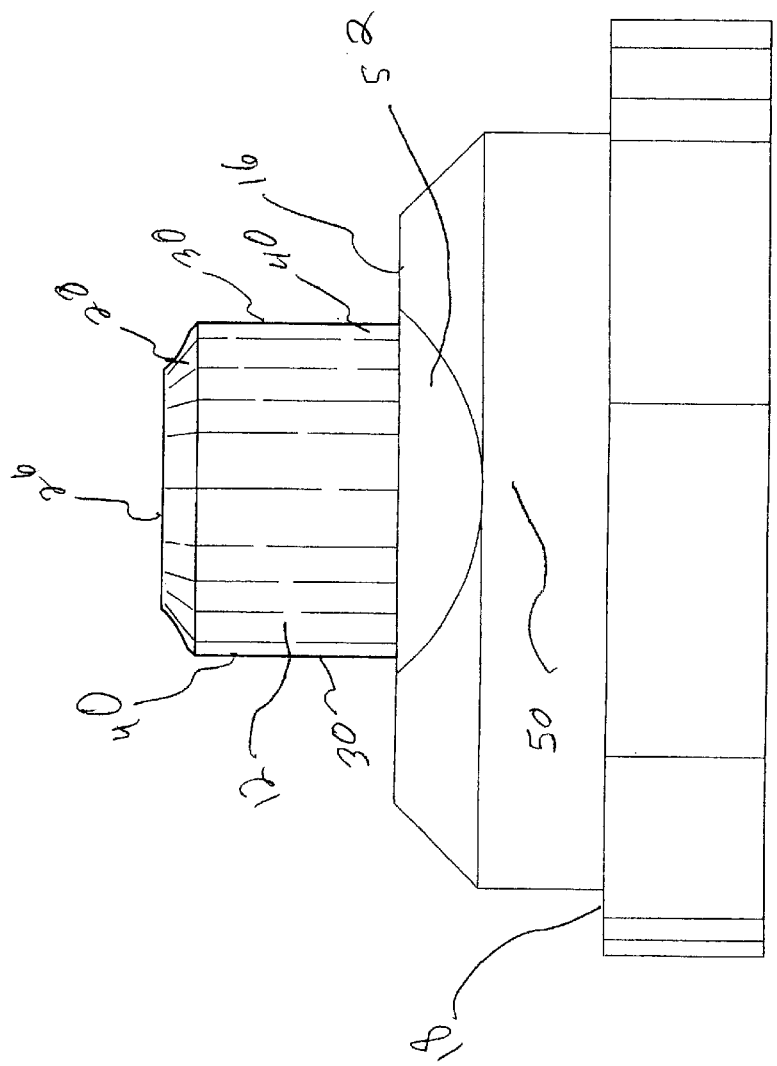
FIG. 5 is a bottom elevation view of the engine cover and bumper device of FIG. 3.
Figure 6:
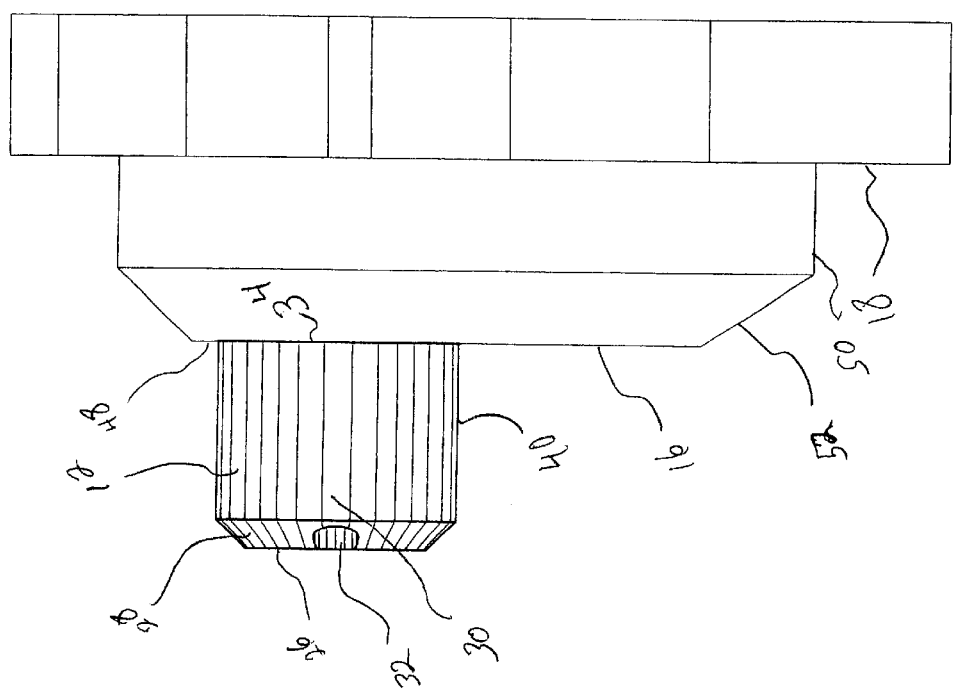
FIG. 6 is right side elevation view of the engine cover and bumper device of FIG. 3.
Figure 7:
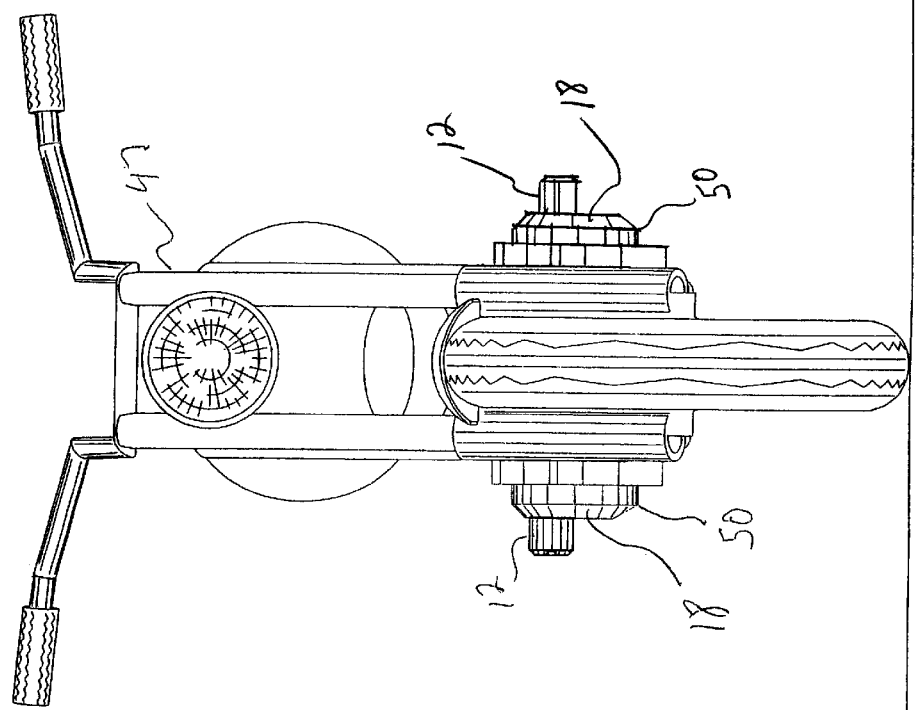
FIG. 7 is a right side elevation view of the engine cover and bumper device of FIG. 3 attached to one side of a motorcycle facing forward in a substantially vertical position.
Figure 8:
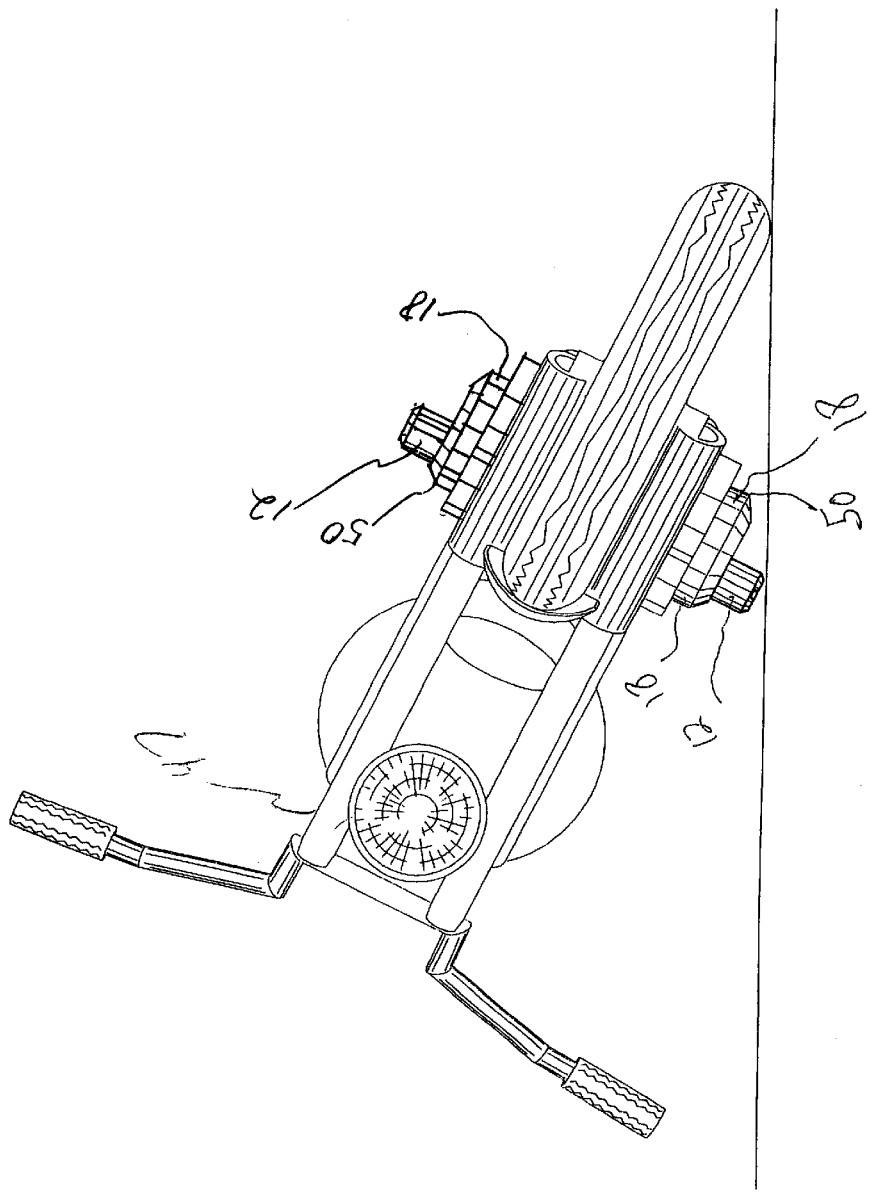
FIG. 8 depicts the engine cover, bumper device and motorcycle of FIG. 7 but with the motorcycle in a typical inclined position relative to a road surface as the motorcycle travels around a relatively "sharp" bend in the road or during a loss of control.

Referring now to the FIGS. 2–8, a motorcycle engine cover bumper device for preventing engagement between a motorcycle engine cover and a road surface is denoted by numeral 10. The device 10 includes a road engagement member 12 that may be fabricated from a myriad of materials including but not limited to high density rubber, plastic or nylon; a plurality of fasteners 14 inserted through the road engagement member 12 and into an outer wall 16 of a motorcycle engine cover 18; and a road engagement member receiving recess 20 machined, cast or otherwise formed in the outer wall 16 of the motorcycle engine cover 18.

The configuration of the road engagement member 12 is substantially oval or elliptic when taking a front elevation view of the device 10 (see FIG. 4), however, alternative configurations such as annular, spherical or rectangular may be utilized. The engagement member 12 is orientated such that an elliptic long axis 22 is parallel to a road surface and an elliptic short axis 24 is perpendicular to the long axis 22. The member 12 further includes a planar (or arcuate) outer wall 26 having a beveled outer periphery 28, arcuate end portions 30 having apertures 32 therethrough, and an inner wall 34 having cylindrical guiding members 36 integrally joined thereto. The guiding members 36 are circumferentially disposed about the apertures 32 to ultimately insert into cooperating upper portions of threaded fastener receiving recesses 38 in the outer wall 16 of the motorcycle engine cover 18 thereby guiding the road engagement member fasteners 14 into the threaded recesses 38. The apertures 32 are disposed through the beveled periphery 28 of the outer wall 26 and adjacent to a peripheral wall 40 of the engagement member 12.

The fasteners 14 are of a screw type variety and fabricated from materials that facilitate the securing of the road engagement member 12 to the motorcycle engine cover. The materials include but are not limited to steel, stainless steel, high density plastics and nylon. The fasteners 14 include a threaded inner end 42, and an outer end 44 capable of being countersunk in a cooperating upper portion of the apertures 32 in the engagement member 12 to avoid contact with foreign objects including the road surface. The fasteners 14 are of sufficient longitudinal dimension to maintain the secured position of the road engagement member 12 to the motorcycle engine cover 18 irrespective of the forces generated should the member 12 engage the road surface when the motorcycle driver leans the motorcycle to form an acute angle with the road surface while traveling around a relatively sharp road bend thereby preventing damage to the motorcycle engine cover and promoting safety for the motorcycle driver. To further stabilize the road engagement member 12 upon the motorcycle engine cover 18 and to shorten the time to attach the member 12, the road engagement member receiving recess 20 is configured to snugly receive an inner portion 46 of the road engagement member 12 thereby aiding a person when inserting the guide members 36 into the threaded fastener receiving recesses 38 disposed within the perimeter of the member receiving recess 20.

The objective, when positioning the road engagement member 12 upon the motorcycle engine cover 18, is to prevent the motorcycle engine cover 18 from engaging the road surface irrespective of the "lean" of the motorcycle 47 (see FIG. 8) when the driver travels through a road bend. Generally, placing the member 12 upon an upper portion 48 of the outer wall 16 of the motorcycle engine cover 18, promotes greater "lean capability" (minimum acute angle formed between the motorcycle 47 and road surface without contact between the motorcycle engine cover 18 and the road surface) when the driver travels around road curves or racing bends. Further, varying the distance separating the inner and outer walls 34 and 26 of the member 12 (the longitudinal dimension of the member 12) will correspondingly vary the lean capability of the motorcycle 47.

One installation procedure for the road engagement member 12 upon the motorcycle engine cover 18 is to vertically position a preselected, non-operating motorcycle 47. The motorcycle 47 is then leaned to a an acute angle position that causes a lower portion 50 of the engine cover 18 to be separated from a road surface a predetermined distance. The bumper member 12 is then joined to the upper portion 48 of the engine cover 18 such that the bumper member 12 engages the road surface thereby preventing the engine cover 18 from engaging the road surface. The motorcycle 47 is then returned to the vertical position.

On occasion, the required lean capability and objective of protecting the motorcycle engine cover 18 cannot be reached due to a lower portion 50 of the motorcycle engine cover 18 contacting the road surface before the road engagement member 12 irrespective of the position of the road engagement member 12. To overcome this scenario, and to obtain a predetermined lean capability for the motorcycle 47, an indented section 52 is included in the lower portion 50 of the motorcycle engine cover 18. The indented section 52 is arcuately configured (when taking front and bottom elevation views, see FIGS. 4 and 5) and angled (when taking a side elevation view, see FIG. 6) to cooperate with the beveled outer periphery 28 of the outer wall 26 of the engagement member 12 such that the beveled outer periphery 28 will engage the road surface before the engine cover 12 when the motorcycle driver leans the motorcycle 47 while traveling around a road bend. Thus, with or without the indented section 52, the orientation or lean capability of the motorcycle 47 relative to the road surface causes a lower portion of the motorcycle engine cover 18 to be disposed a predetermined distance above a road surface (planar or otherwise) when the motorcycle driver travels through a road bend, and causes the road engagement member 12 to be disposed upon an upper portion of the motorcycle engine cover 18 such that the road engagement member 12 engages the road surface while the lower portion of the motorcycle engine cover 18 is disposed above the road surface the predetermined distance.

In operation, road engagement members 12 are joined to opposing motorcycle engine covers 18 upon a portion that prevents the respective engine cover 18 from engaging a road surface when a motorcycle driver leans the motorcycle 47 while traveling through a road bend or upon a "fall" when the motorcycle 47 is sliding in a horizontal position upon the road surface. The engagement member 12 may include a myriad of configurations fabricated from material that will not generate sparks when slidably engaging a road surface. An elliptical member 12 is preferred with a long axis 22 disposed parallel to the road surface thereby providing sufficient "wearable" surface area to a beveled outer periphery 28 of an outer wall 26 of the engagement member 12 should the member 12 contact the road surface. The road engagement member 12 may be joined directly to the outer wall 26 of the engine cover 18, or alternatively, may be snugly inserted into a recess 20 in the outer wall 26 such that a predetermined inner portion 46 of the member 12 is removably received by the recess 20 to facilitate increased stability to the member 12 whereby the member 12 will not separate from the engine cover 18 should the member 12 engage a road surface. The configuration, longitudinal dimension, and location of the road engagement member 12 are selected to cooperate with the motorcycle driver and engine cover 18 such that the drivers legs and/or feet are not obstructed by the member 12 while the driver operates the motorcycle 47.

What is claimed and desired to be secured by Letters Patent of the United States is:

1. A motorcycle engine cover bumper device comprising:
a road engagement member;
means for attaching said member to the motorcycle engine cover; and
means for positioning said road engagement member upon the motorcycle engine cover such that the road engagement member engages a road surface before the motorcycle engine cover engages the road surface.

2. The device of claim 1 wherein said road engagement member is fabricated from hard rubber.

3. The device of claim 1 wherein said road engagement member is fabricated from plastic.

4. The device of claim 1 wherein said road engagement member is configured substantially elliptic when taking a front elevation view of said device.

5. The device of claim 4 wherein said elliptic road engagement member is orientated such that an elliptical long axis is parallel to the road surface.

6. The device of claim 1 wherein said road engagement member includes a beveled outer periphery.

7. The device of claim 1 wherein said attaching means includes a plurality of fasteners inserted through said road engagement member and into an outer portion of the motorcycle engine cover.

8. The device of claim 7 wherein said fasteners includes screws threaded into an outer wall of the motorcycle engine cover.

9. The device of claim 7 wherein said fasteners are disposed adjacent to the periphery of road engagement member.

10. The device of claim 7 wherein said fasteners are disposed adjacent to end portions of an elliptically configured road engagement member.

11. The device of claim 7 wherein said fasteners are disposed through a beveled outer periphery of said road engagement member.

12. The device of claim 7 wherein said fasteners are countersunk.

13. The device of claim 1 wherein said attaching means includes guiding members integrally joined to said road engagement member, said guiding members ultimately inserting into an upper portion of corresponding threaded recesses in the motorcycle engine cover to guide road engagement fasteners into the threaded recesses.

14. The device of claim 1 wherein said attaching means includes a road engagement member receiving recess in the motorcycle engine cover, said recess being configured to snugly receive an inner portion of said road engagement member whereby said road engagement member is stabilized.

15. The device of claim 14 wherein said road engagement member receiving recess includes at least one fastener receiving recess disposed within the perimeter of said road engagement member receiving recess.

16. The device of claim 1 wherein said positioning means includes an indented lower portion of the motorcycle engine cover.

17. The device of claim 16 wherein said indented lower portion is arcuately configured to cooperate with said road engagement member.

18. The device of claim 1 wherein said positioning means includes orientating a preselected motorcycle such that an acute angle is formed between a road surface and the motorcycle when taking a front view of the motorcycle.

19. The device of claim 18 wherein the motorcycle orientation causes a lower portion of the motorcycle engine cover to be disposed above a planar road surface a predetermined distance.

20. The device of claim 18 wherein the motorcycle orientation causes an indented lower portion of the motorcycle engine cover to be disposed above a planar road surface a predetermined distance.

21. The device of claim 19 wherein the motorcycle orientation causes said road engagement member to be disposed upon an upper portion of the motorcycle engine cover such that said road engagement member engages the planar road surface while the lower portion of the motorcycle engine cover is disposed above the planar road surface said predetermined distance.

22. A device for preventing engagement between a motorcycle engine cover and a road surface when the motorcycle driver causes the motorcycle to lean while traveling through a road bend comprising:
a road engagement member;
means for removably securing said road engagement member to a motorcycle engine cover; and
means for positioning said road engagement member upon a portion of the motorcycle engine cover whereby the motorcycle engine cover is prevented from engaging the road surface when the motorcycle driver leans the motorcycle while traveling through a bend in the road.

23. The device of claim 22 wherein said road engagement member is configured substantially elliptic when taking a front elevation view of said device.

24. The device of claim 22 wherein said road engagement member includes a beveled outer periphery.

25. The device of claim 22 wherein said securing means includes at least one fastener inserted through said road engagement member and into a portion of the motorcycle engine cover.

26. The device of claim 25 wherein said fastener is countersunk in said road engagement member thereby preventing engagement between said fastener and the road surface.

27. The device of claim 22 wherein said securing means includes a road engagement member receiving recess in the motorcycle engine cover, said recess being configured to snugly receive an inner portion of said road engagement member.

28. The device of claim 22 wherein said positioning means includes an indented lower portion of the motorcycle engine cover.

29. The device of claim 22 wherein said positioning means includes orientating a motorcycle such that an angle is formed with the road that disposes a lower portion of the motorcycle engine cover above the road a predetermined distance.

30. The device of claim 29 wherein said orientated motorcycle causes said road engagement member to be disposed upon an upper portion of the motorcycle engine cover such that said road engagement member engages the planar road surface while the lower portion of the motorcycle engine cover is disposed above the planar road surface said predetermined distance.

31. A method for preventing engagement between a motorcycle engine cover and a road surface, said method comprising the steps of:
providing a road engagement member;
securing said road engagement member to a motorcycle engine cover; and
disposing said road engagement member upon the motorcycle engine cover such that the motorcycle engine cover is prevented from engaging the road surface while the road engagement member engages the road surface.

32. The method of claim 31 wherein the step of providing a road engagement member includes the step of configuring said member to form an ellipse when taking a front elevation view of said member.

33. The method of claim 31 wherein the step of providing a road engagement member includes the step of beveling an outer periphery of said member.

34. The method of claim 31 wherein the step of securing said road engagement member includes the step of providing at least one fastener inserted through said road engagement member and into a portion of the motorcycle engine cover.

35. The method of claim 34 wherein the step of providing a fastener includes the step of countersinking said fastener in said road engagement member.

36. The method of claim 31 wherein the step of securing said road engagement member includes the step of providing a road engagement member receiving recess in the motorcycle engine cover, said recess being configured to snugly receive an inner portion of said road engagement member.

37. The method of claim 31 wherein the step of disposing said road engagement member upon the engine cover includes the step of indenting a lower portion of the motorcycle engine cover.

38. The method of claim 31 wherein the step of disposing said road engagement member upon the engine cover includes the step of orientating a motorcycle such that an angle is formed with the road that disposes a lower portion of the motorcycle engine cover above the road a predetermined distance.

39. The method of claim 38 wherein the step of orientating a motorcycle includes the step of disposing said road engagement member upon an upper portion of the motorcycle engine cover such that said road engagement member engages the planar road surface while the lower portion of the motorcycle engine cover is disposed above the road said predetermined distance.

* * * * *